United States Patent
Chappell et al.

(10) Patent No.: US 6,665,622 B1
(45) Date of Patent: Dec. 16, 2003

(54) SPECTRAL CHARACTERIZATION METHOD FOR SIGNAL SPECTRA HAVING SPECTRALLY-SEPARATED SIGNAL PEAKS

(75) Inventors: Gerard Chappell, Penngrove, CA (US); Tom Wright, Santa Rosa, CA (US); Brian Kane, Warwick, NY (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/487,032

(22) Filed: Jan. 19, 2000

(51) Int. Cl.[7] ................................................ G06F 19/00
(52) U.S. Cl. ............................ 702/76; 702/66; 702/75; 702/190
(58) Field of Search ........................... 702/66, 67, 69, 702/70, 71, 73–78, 124, 126, 183, 189–191, 193, 197–199, 195, 194; 324/76.19, 614, 76, 19; 359/124, 115

(56) References Cited

U.S. PATENT DOCUMENTS

| | | | | | |
|---|---|---|---|---|---|
| 4,320,523 A | * | 3/1982 | Horikawa et al. | ........... | 375/350 |
| 4,630,304 A | * | 12/1986 | Borth et al. | ............... | 381/94.3 |
| 4,637,245 A | * | 1/1987 | Iwata et al. | ................ | 73/35.03 |
| 4,644,523 A | * | 2/1987 | Horwitz | ....................... | 370/479 |
| 4,881,401 A | * | 11/1989 | Cockerham | ................ | 73/35.03 |
| 4,943,776 A | * | 7/1990 | Polito et al. | ................. | 324/391 |
| 5,340,979 A | * | 8/1994 | Baney et al. | ............ | 250/214 B |
| 5,393,557 A | * | 2/1995 | Darling, Jr. | .................... | 73/116 |
| 5,400,644 A | * | 3/1995 | Remboski et al. | .......... | 73/35.04 |
| 5,535,722 A | * | 7/1996 | Graessley et al. | ...... | 123/406.21 |
| 5,668,741 A | * | 9/1997 | Prigent | ......................... | 702/77 |
| 5,987,392 A | * | 11/1999 | Tucker et al. | ................. | 702/66 |
| 6,226,117 B1 | * | 5/2001 | Hentschel | .................... | 359/337 |
| 6,271,945 B1 | * | 8/2001 | Terahara | ..................... | 359/124 |

* cited by examiner

Primary Examiner—Marc S. Hoff
Assistant Examiner—Jeffrey R West
(74) Attorney, Agent, or Firm—John L. Imperato

(57) ABSTRACT

A spectral characterization method accurately characterizes an applied signal spectrum that has multiple, spectrally-separated signal peaks. The method detects signal peaks within the spectrum and measures the spectral content of that spectrum using a first measurement bandwidth that is sufficiently wide to encompass each of the signal peaks and accurately measure a signal component of the spectrum. Spectral content of the spectrum measured using a narrow measurement bandwidth that accurately characterizes a noise component of the spectrum. Signal-to-noise ratio for the signal peaks can be calculated based on the measurements performed using the first and second measurement bandwidths. The spectral characterization method is implemented using a spectral measurement instrument having an adjustable measurement bandwidth.

4 Claims, 2 Drawing Sheets

SPECTRAL CHARACTERIZATION METHOD FOR SIGNAL SPECTRA HAVING SPECTRALLY-SEPARATED SIGNAL PEAKS

BACKGROUND OF THE INVENTION

In wavelength division multiplexed (WDM) signal spectra, high-bandwidth modulation is imposed upon a series of wavelength-separated optical carriers. To characterize a WDM signal spectrum, accurate measurement of the modulated optical carriers (the signal component of the spectrum) and the noise within spectral intervals between the modulated optical carriers (the noise component of the spectrum) are needed. A trade-off in measurement accuracy exists when measurement bandwidth is relied upon to measure both the signal component and the noise component of the WDM spectrum. With a measurement bandwidth that is wide enough to accommodate the high bandwidth of the modulated optical carriers, the measurement sensitivity is typically too low to enable accurate measurement of the noise component of the spectrum. Alternatively, with a measurement bandwidth that is narrow enough to achieve sufficient measurement sensitivity to accurately measure the noise component of the spectrum, the measurement bandwidth is too low to accurately characterize the signal component of the spectrum. There is a need for a characterization method that provides high enough measurement sensitivity to accurately characterize the noise component of a WDM spectrum, and that also provides high enough measurement bandwidth to accurately characterize the signal component of the WDM spectrum.

SUMMARY OF THE INVENTION

A spectral characterization method constructed according to the preferred embodiment of the present invention accurately characterizes the signal component and the noise component of an applied signal spectrum, such as the spectrum of a wavelength division multiplexed (WDM) signal, that has multiple, spectrally-separated signal peaks.

The method includes detecting signal peaks within the signal spectrum and measuring the spectral content of that spectrum using a first measurement bandwidth that is sufficiently wide to encompass each of the signal peaks. This wide measurement bandwidth provides for accurate measurement of the signal component of the signal spectrum. A center wavelength and peak amplitude value for each signal peak in the signal spectrum are is designated based on the measured spectral content of the signal spectrum made using the first measurement bandwidth.

Spectral content of the signal spectrum is also measured using a second measurement bandwidth that is sufficiently narrow to substantially exclude capture of the signal peaks during measurement within the intervals of spectral separation between the signal peaks. Higher measurement sensitivity results in the spectral characterization of the noise component as the second measurement bandwidth is set narrower relative to the first measurement bandwidth. The noise component of the signal spectrum is accurately characterized when spectral content of the signal spectrum is measured using the second measurement bandwidth. Accurate characterization of the signal spectrum results from combining the characterized signal component measured using the wide, first measurement bandwidth, with the characterized noise component measured using the narrow, second measurement bandwidth. Signal-to-noise ratio at the center wavelength of each signal peak is calculated from the peak amplitude value for the signal peak and a noise level at the center wavelength extracted from the spectral content measured using the second measurement bandwidth at spectral offsets from the designated center wavelengths of each signal peak. The spectral characterization method can be implemented using an optical monochromator, optical spectrum analyzer or other spectral measurement instrument having an adjustable measurement bandwidth.

DETAILED DESCRIPTION OF THE PREFERRED EMBODIMENT

Figure 1:
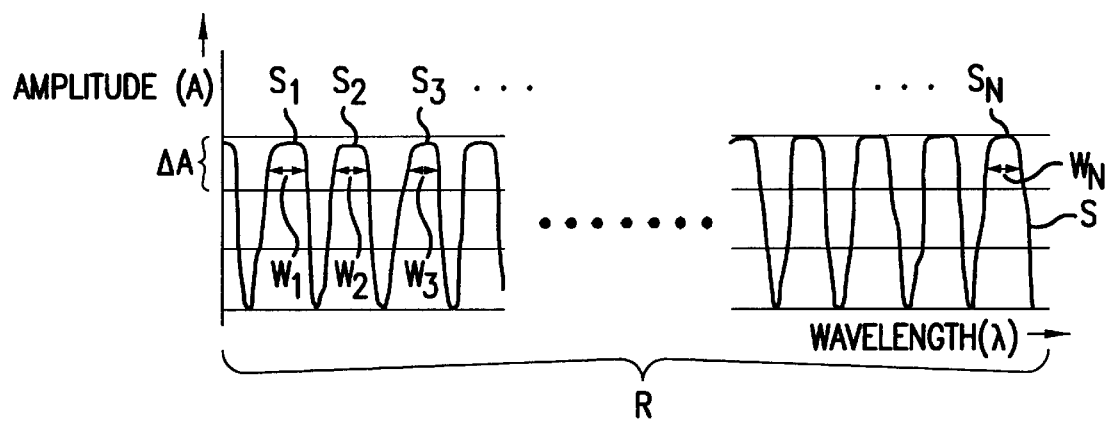
FIG. 1 shows a signal spectrum for characterization by the spectral characterization method constructed according to the preferred embodiment of the present invention.

FIG. 1 shows an applied signal spectrum S for spectral characterization using the method constructed according to the preferred embodiment of the present invention. The signal spectrum S within a spectral R has multiple, spectrally-separated signal peaks $S_1-S_N$ with associated spectral widths $W_1-W_N$. In this example, the signal spectrum S is a wavelength division multiplexed (WDM) optical signal spectrum, typically present in optical systems and networks. Alternatively, the signal spectrum S is an electrical signal spectrum having multiple, spectrally-separated signal peaks $S_1-S_N$ with associated spectral widths $W1-W_N$. In a WDM signal spectrum, the spectrally-separated signal peaks $S_1-S_N$ result from high-bandwidth modulation imposed upon a series of wavelength-separated or frequency-separated optical carriers. In this example, the optical carriers are frequency-separated by 50 GHz within the spectral range R that spans from 1550 nanometers to 1555 nanometers.

Figure 2:
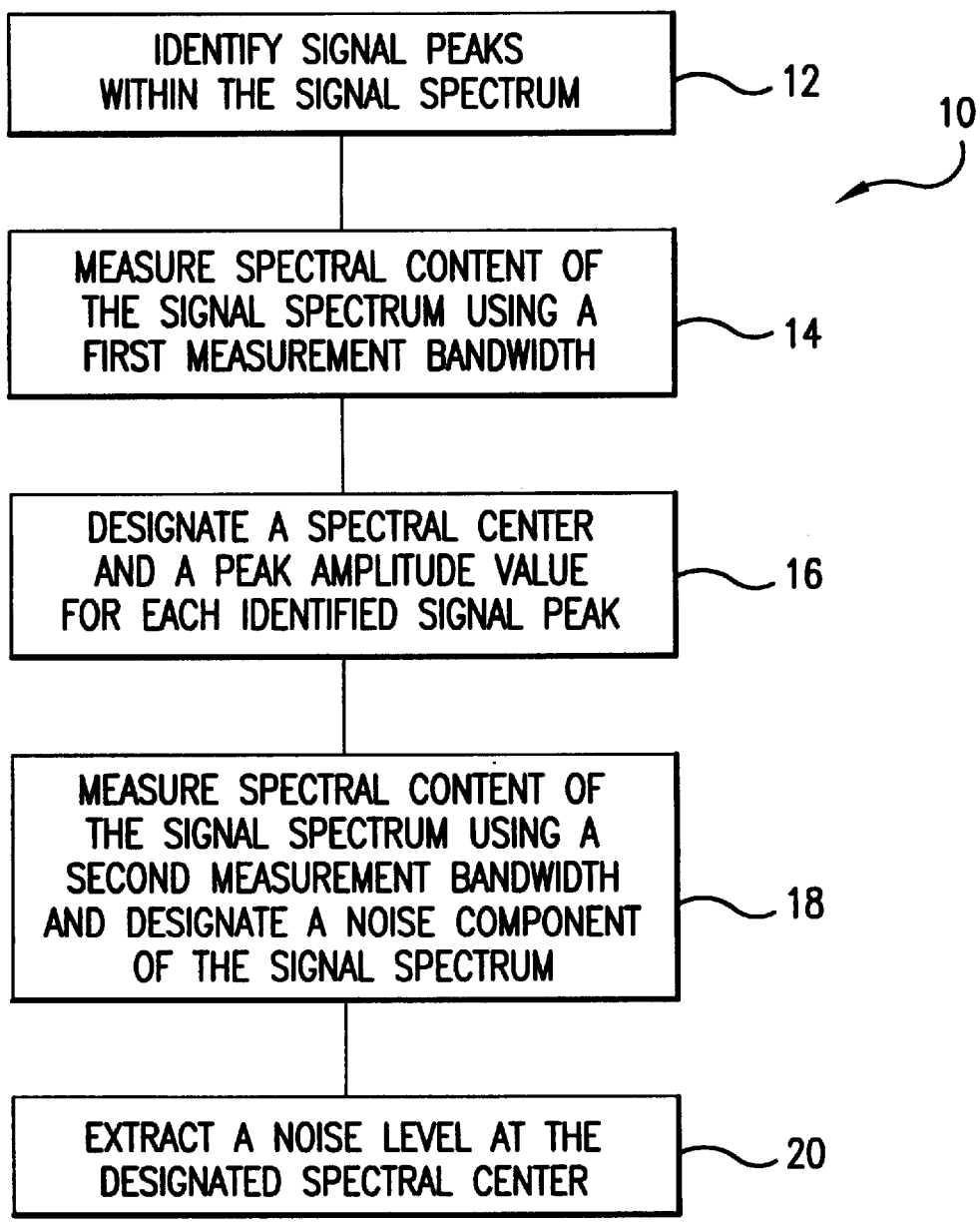
FIG. 2 is a flow diagram for the spectral characterization method constructed according to the preferred embodiment of the present invention.

FIG. 2 is a flow diagram 10 of the spectral characterization method constructed according to the preferred embodiment of the present invention. The method is implemented using an optical monochromator, optical spectrum analyzer or other spectral measurement instrument having adjustable measurement bandwidth. In step 12 of the flow diagram 10, the signal peaks $S_1-S_N$ within the applied signal spectrum S are identified. By measuring the amplitude of the signal spectrum S as a function of wavelength and detecting amplitude excursions that exceed a defined amount ΔA, the signal peaks $S_1-S_N$ are distinguished from noise peaks, spurious responses and other characteristics (not shown) that may be present in the signal spectrum S. In this example, an amplitude excursion ΔA of 5 dB is sufficient to identify the signal peaks $S_1-S_N$. Alternatively, the signal peaks $S_1-S_N$ are identified by the occurrence of the signal peaks at predesignated spectral locations.

Figure 3:
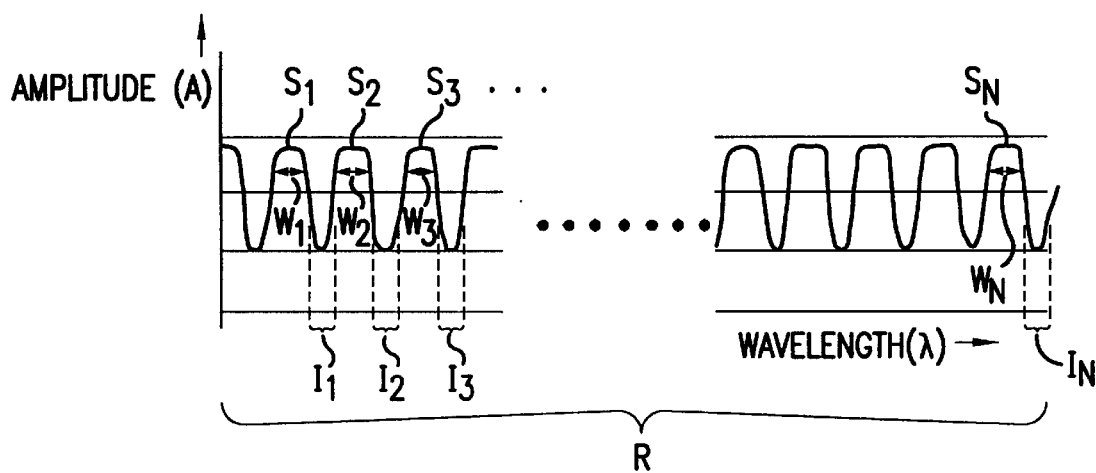
FIG. 3 shows a spectral content of the signal spectrum measured using a first measurement bandwidth in accordance with the preferred embodiment of the present invention.

In step 14, spectral content of the signal spectrum S is measured over the range R using a first measurement bandwidth that is sufficiently wide to encompass each signal peak $S_1$–$S_N$ within the spectrum S. FIG. 3 shows the measured spectral content resulting from step 14. In this example, the first measurement bandwidth is 0.2 nanometers. Due to the width of this first measurement bandwidth, the signal peaks $S_1$–$S_N$ that comprise the signal component of the signal spectrum S are accurately characterized. However, the signal spectrum S within the intervals of spectral separation $I_1$–$I_N$, between the signal peaks $S_1$–$S_N$, that comprise the noise component of the signal spectrum S are not accurately characterized when the wide measurement bandwidth is used. With the first measurement bandwidth being wide enough to accommodate the spectral width $W_1$–$W_N$ of the signal peaks $S_1$–$S_N$, portions of the signal peaks $S_1$–$S_N$ are captured within the first measurement bandwidth in step 14 during measurement of spectral content within the intervals of spectral separation $I_1$–$I_N$ between signal peaks $S_1$–$S_N$. In addition, with the first measurement bandwidth being wide enough to accommodate the signal peaks $S_1$–$S_N$, the measurement sensitivity of a typical measurement instrument is too low for accurate characterization of the noise component of the spectrum S.

"In step 16, a spectral center, such as a center frequency or center wavelength $C_1(\lambda)$–$C_N(\lambda)$ corresponding to each signal peak $S_1$–$S_N$ identified in step 12 is designated. The center wavelengths $C_1(\lambda)$–$C_N(\lambda)$ of the signal peaks $S_1$–$S_N$ are the center of masses of each of the signal peaks $S_1$–$S_N$. The center of mass $C(\lambda)$ of each signal peak is computed according to the measured spectral content of the signal spectrum S from step 14 using the following relationship:"

$$C(\lambda) = \sum_{i=\lambda_{LOWER}}^{i=\lambda_{UPPER}} A_i \lambda_i \bigg/ \sum_{i=\lambda_{LOWER}}^{i=\lambda_{UPPER}} A_i$$

where i is an index of measured amplitude levels Ai at corresponding wavelengths $\lambda i$ between a wavelength $\lambda_{LOWER}$ and $\lambda_{UPPER}$.

The wavelengths $\lambda_{LOWER}$ and $_{UPPER}$ are the lower and upper 3 dB wavelengths of the signal peaks $S_1$–$S_N$, respectively. While the center wavelengths $C_1(\lambda)$–$C_N(\lambda)$ are preferably designated as the center of mass of each corresponding signal peak $S_1$–$S_N$, the center wavelengths are alternatively designated as a wavelength centered between the 3dB wavelengths of each signal peak $S_1$–$S_N$, or by choosing a wavelength corresponding to a measured maximum amplitude point within each of the signal peaks $S_1$–$S_N$.

A peak amplitude value for each signal peak $S_1$–$S_N$ can also be designated from the measured spectral content of the signal spectrum S performed in step 14 and the center wavelength designated in step 16. The peak amplitude value is preferably an average of acquired measurements of the spectral content from step 14 centered at the center wavelength designated in step 16, and within a region of the first measurement bandwidth wherein the first measurement bandwidth has substantially flat response characteristics. In this example, the first measurement bandwidth is defined by an aperture that has a substantially flat response characteristic over approximately the center eighty percent of the aperture's passband. Alternatively, the peak amplitude value for each signal peak $S_1$–$S_N$ is designated by the highest amplitude measured in step 14 within each of the signal peaks $S_1$–$S_N$.

Figure 4:
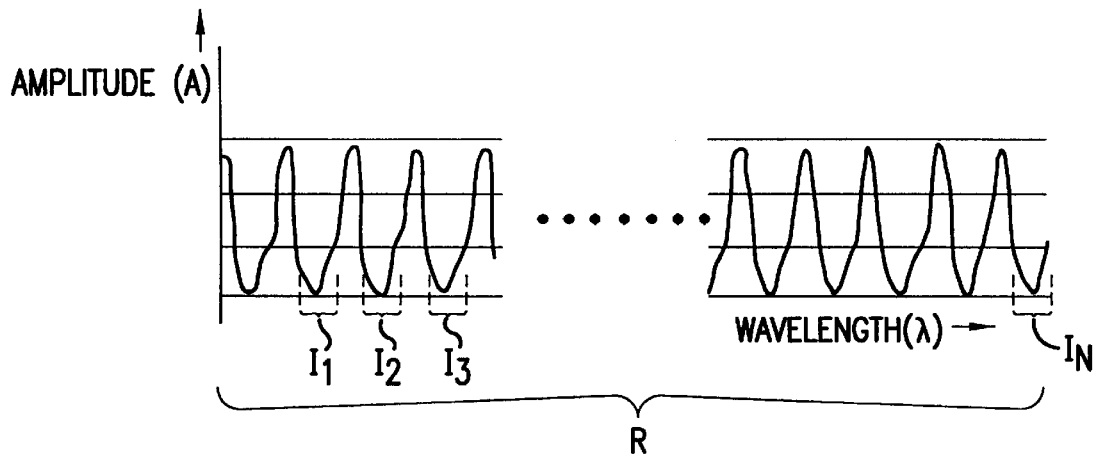
FIG. 4 shows a spectral content of the signal spectrum measured using a second measurement bandwidth in accordance with the preferred embodiment of the present invention.

In step 18, the spectral content of the signal spectrum S is measured over the range R using a second measurement bandwidth that is sufficiently narrow to substantially exclude capture of the signal peaks $S_1$–$S_N$ during measurement of spectral content within intervals of spectral separation $I_1$–$I_N$ between the signal peaks $S_1$–$S_N$. FIG. 4 shows the measured spectral content resulting from step 18. In this example, the second measurement bandwidth is 0.06 nanometers. Due to the narrow second measurement bandwidth, the intervals of spectral separation $I_1$–$I_N$ between the signal peaks $S_1$–$S_N$ that comprise the noise component of the signal spectrum S are accurately characterized. However, using this narrow measurement bandwidth, the spectral widths $W_1$–$W_N$ of the signal peaks $S_1$–$S_N$ of the signal spectrum S are not accommodated. Therefore, the signal component of the signal spectrum S is not accurately characterized when the narrow, second measurement bandwidth is used. As the second measurement bandwidth becomes narrower relative to the first measurement bandwidth, measurement sensitivity typically increases, enabling accurate measurement and designation of the noise component of the signal spectrum S.

Accurate characterization of the signal spectrum S shown in FIG. 1 results from a combination of the measurements of spectral content in step 14 and step 18 of the flow diagram shown in FIG. 2. The signal component of the signal S is accurately measured using the wide, first measurement bandwidth and can be combined with the noise component of the signal spectrum S which is accurately measured using the narrow, second measurement bandwidth. Step 16 is optionally included in the measurement method when center wavelengths $C_1(\lambda)$–$C_N(\lambda)$ of the signal peaks $S_1$–$S_N$ are sought.

Signal-to-noise ratio at the center wavelength $C_1(\lambda)$–$C_N(\lambda)$ of each signal peak $S_1$–$S_N$ within the signal spectrum S is calculated as the ratio of the peak amplitude value designated in step 16 minus a noise level at the center wavelength extracted in step 20 to the noise level at the center wavelength extracted in step 20.

In step 20, the noise level of the signal spectrum S is extracted from amplitude levels versus wavelength within the measured spectral content of step 18 using various approaches that are implemented in the alternative, or in combination with each other. In each approach, the noise level at the center wavelength of each signal peak $S_1$–$S_N$ is extracted from the amplitude levels at spectral offsets, such as frequencies offset or wavelengths offset from the center wavelengths.

In a first approach, the wavelength offset is predefined and the noise level at the center wavelength is the average of the amplitude level at the predefined wavelength offset below the center wavelength of a signal peak and the measured amplitude level at the predefined wavelength offset above the center wavelength of the signal peak.

In a second approach, the wavelength offset is based on detecting minimum amplitude levels. Here, the noise level is extracted by linearly interpolating between the minimum amplitude level measured at a wavelength offset from the center wavelength but below the center wavelength, and the minimum amplitude level measured at a wavelength offset from the center wavelength but above the center wavelength.

In a third approach, the wavelength offsets from the center wavelength of each of the signal peaks $S_1$–$S_N$ are defined by the wavelengths that are equidistant from the adjacent signal peak above the center wavelength and the adjacent signal peak below the center wavelength. The noise level is then extracted by linearly interpolating between measured amplitude levels at these wavelength offsets.

Step 20 of the flow diagram 10 is optionally included in the spectral characterization method when noise level or signal-to-noise ratio of the signal spectrum S is sought.

While the preferred embodiment of the present invention has been illustrated in detail, it should be apparent that modifications and adaptations to this embodiment may occur to one skilled in the art without departing from the scope of the present invention as set forth in the following claims.

What is claimed is:

1. A spectral characterization method for a signal spectrum having at least two spectrally-separated signal peaks, comprising:

identifying the at least two signal peaks within the signal spectrum;

measuring spectral content of the signal spectrum using a first measurement bandwidth sufficiently wide to encompass each signal peak of the at least two signal peaks;

designating a signal component of the signal spectrum from the spectral content of the encompassed signal peaks as measured using the first measurement bandwidth;

measuring spectral content of the signal spectrum using a second measurement bandwidth sufficiently narrow to substantially exclude capture of the at least two signal peaks within at least one interval of spectral separation between the at least two signal peaks; and designating a noise component of the signal spectrum from the spectral content measured using the second measurement bandwidth over the at least one interval of spectral separation;

designating a spectral center for each identified signal peak of the at least two signal peaks according to the measured spectral content of the signal spectrum using the first measurement bandwidth;

assigning a peak amplitude value to each signal peak of the at least two signal peaks; and extracting a noise level at the spectral center of the at least two signal peaks from amplitude levels at defined spectral offsets from the spectral center and within the spectral content measured using the second measurement bandwidth linearly interpolating between amplitude levels at the spectral offsets from the spectral center, wherein the defined spectral offsets correspond to a minimum amplitude level at a spectral location below each signal peak and a minimum amplitude level at a spectral location above each signal peak of the at least two signal peaks.

2. A spectral characterization method for a signal spectrum having least two spectrally-separated signal peaks, comprising:

identifying the at least two signal peaks within the signal spectrum;

measuring spectral content of the signal spectrum using a first measurement bandwidth sufficiently wide to encompass each signal peak of the at least two signal peaks;

designating a signal component of the signal spectrum from the spectral content of the encompassed signal peaks as measured using the first measurement bandwidth;

measuring spectral content of the signal spectrum using a second measurement bandwidth sufficiently narrow to substantially exclude capture of the at least two signal peaks within at least one interval of spectral separation between the at least two signal peaks; and designating a noise component of the signal spectrum from the spectral content measured using the second measurement bandwidth over the at least one interval of spectral separation;

designating a spectral center for each identified signal peak of the at least two signal peaks according to the measured spectral content of the signal spectrum using the first measurement bandwidth;

assigning a peak amplitude value to each signal peak of the at least two signal peaks;

extracting a noise level at the spectral center of the at least two signal peaks from amplitude levels at defined spectral offsets from the spectral center; and calculating the signal-to-noise ratio at the spectral center for at least one signal peak of the at least two signal peaks according to the peak amplitude level and the extracted noise level corresponding to the at least one signal peak.

3. A spectral characterization method for a signal spectrum having at least two spectrally-separated signal peaks, comprising:

identifying the at least two signal peaks within the signal spectrum;

measuring spectral content of the signal spectrum using a first measurement bandwidth sufficiently wide to encompass each signal peak of the at least two signal peaks;

designating a signal component of the signal spectrum from the spectral content of the encompassed signal peaks as measured using the first measurement bandwidth;

measuring spectral content of the signal spectrum using a second measurement bandwidth sufficiently narrow to substantially exclude capture of the at least two signal peaks within at least one interval of spectral separation between the at least two signal peaks; and designating a noise component of the signal spectrum from the spectral content measured using the second measurement bandwidth over the at least one interval of spectral separation;

designating a spectral center for each identified signal peak of the at least two signal peaks according to the measured spectral content of the signal spectrum using the first measurement bandwidth;

assigning a peak amplitude value to each signal peak of the at least two signal peaks;

extracting a noise level at the spectral center of the at least two signal peaks from amplitude levels at defined spectral offsets from the spectral center and within the spectral content measured using the second measurement bandwidth linearly interpolating between amplitude levels at the spectral offsets from the spectral center; and calculating the signal-to-noise ratio at the spectral center for at least one signal peak of the at least two signal peaks according to the peak amplitude level and the extracted noise level corresponding to the at least one signal peak.

4. The method of claim 1 further including calculating the signal-to-noise ratio at the spectral center for at least one signal peak of the at least two signal peaks according to the peak amplitude level and the extracted noise level corresponding to the at least one signal peak.

* * * * *